United States Patent
Kuo et al.

(10) Patent No.: US 9,771,456 B2
(45) Date of Patent: Sep. 26, 2017

(54) POLYIMIDE RESINS CONTAINING POLYMALEIC ANHYDRIDE AND METHOD FOR MANUFACTURING THE SAME

(71) Applicant: ITEQ CORPORATION, Taoyuan County (TW)

(72) Inventors: Chao-Hui Kuo, Taoyuan County (TW); Ming-Hung Huang, Taoyuan County (TW); Po-Hsun Lee, Taoyuan County (TW); Shun-Cheng Wang, Taoyuan County (TW)

(73) Assignee: ITEQ Corporation, Taoyuan (TW)

( * ) Notice: Subject to any disclaimer, the term of this patent is extended or adjusted under 35 U.S.C. 154(b) by 977 days.

(21) Appl. No.: 13/932,367

(22) Filed: Jul. 1, 2013

(65) Prior Publication Data
US 2015/0004862 A1  Jan. 1, 2015

(51) Int. Cl.
*C08G 73/10* (2006.01)
*C08G 73/06* (2006.01)

(52) U.S. Cl.
CPC ..... *C08G 73/0611* (2013.01); *Y10T 442/2992* (2015.04); *Y10T 442/656* (2015.04)

(58) Field of Classification Search
CPC ............... C08G 73/10; Y10T 442/2992; Y10T 442/656442/180, 378
See application file for complete search history.

(56) References Cited

U.S. PATENT DOCUMENTS 4,734,204 A * 3/1988 Lamb ................... C08F 8/14
                                                    210/708
5,160,642 A   11/1992 Schield et al.

FOREIGN PATENT DOCUMENTS

CN       1784457 A    6/2006
CN     101454378 A    6/2009
(Continued)

OTHER PUBLICATIONS

Chinese Office Action from corresponding Application No. 201310183875.5 dated Jan. 25, 2017; 5 pgs.

*Primary Examiner* — Vincent A Tatesure
(74) *Attorney, Agent, or Firm* — Muncy, Geissler, Olds & Lowe, P.C.

(57) ABSTRACT

The invention relates to a polyimide containing polymaleic anhydride having the formula:

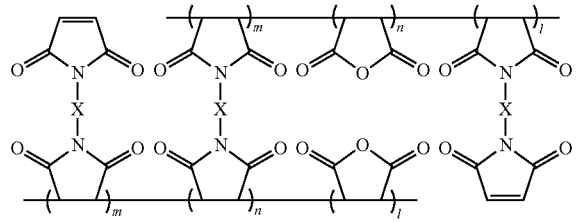

wherein X represents functional groups having carbon chain with carbon numbers more than 10, benzene ring (Continued)

and a combination of carbon chain with carbon numbers more than 10 and benzene ring; and m, n and l are integers, and larger than or equal to 1.

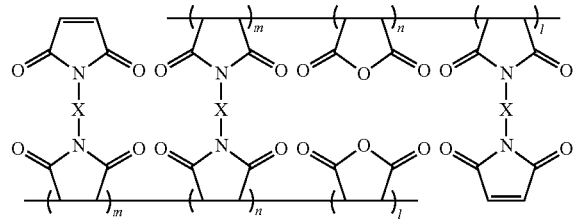

3 Claims, 8 Drawing Sheets

(56) References Cited

FOREIGN PATENT DOCUMENTS

| | | |
|---|---|---|
| CN | 101921377 A | 12/2010 |
| CN | 102432752 A | 5/2012 |
| CN | 102504698 A | 6/2012 |
| CN | 102838928 A | 12/2012 |

* cited by examiner

POLYIMIDE RESINS CONTAINING POLYMALEIC ANHYDRIDE AND METHOD FOR MANUFACTURING THE SAME

BACKGROUND OF THE INVENTION

1. Technical Field

The invention relates to polyimide resins, particularly to polyimide resins containing polymaleic anhydride.

2. Related Art

Thermal curing resin compositions have been developing by material industries for their excellent strength, temperature resistance and low water absorption. As thermal curing resins, polyimides are noted for their excellent temperature resistance. Thin films that manufactured by thermal curing polyimide resin compositions may be extensively in the fields of printed circuit boards, surface heating element, electromagnetic shield material and flat cable, etc.

Polyimides have excellent heat resistance, mechanical properties and chemical resistance. Therefore, the polyimides are widely used in the aerospace industry, electronic materials, etc. Now the polyimides that are generally in use are mostly aromatic polyimides. However, most of the aromatic polyimide cannot be dissolved in the solvent and is non-thermoplastic, and thus difficult to process. Polyamic acid that is precursor of polyimide can be dissolved in the solvent. Therefore, polyimide may be formed by forming a desired shape by the polyamic acid solution, and then imidization is carried out.

However, imidization is accompanied by water evaporation because the reaction temperature of thermal imidization has reached more than 300° C. that exceeds the boiling point of water. Accordingly, the disadvantage of wrinkled surface of the thick film formed of the polyimide resin by the thermal ring closure step will occur. The temperature for film forming is hard to select properly. On the other hand, the film formed of the polyamic acid fails to keep a property of excellent temperature resistance of the polyimide as the imidization is omitted. Also, polyamic acid solution is hard to preserve, because hydrolysis of the polyamic acid solution is easy to occur in presence of water.

Polyimides are used extensively in the electronic fields as insulation film or protective coating on semiconductor devices. Especially, aromatic polyimides play an important role for high density and multi-function of flexible printed circuit substrates and integrated circuits due to the excellent temperature resistance, mechanic strength and insulation property.

Accordingly, precursor solution of polyimides is typically used for the formation of interlayer insulation film or protective coating of micro-circuit. The precursor solution of polyimides such as polyamic acid (PAA) solution, polyamic acid acetate solution, polyamic acid trimethylsilyl acetate solution and polyamic acid bis(diethyl amide) solution may be formed by reacting diamine compounds with tetracarboxylic dianhydride. The precursor solutions of polyimides are all polymer solution with high degree of polymerization. Typically, the film of polyimides is formed by coating the polymer solution on a substrate such as copper or glass, and then heated to carry out imidization and remove the solvent.

However, it is required to reduce the concentration of solute for obtaining a proper viscosity of the polymer solution when coating the polymer solution with high degree of polymerization. On the other hand, in order to increase the production, it is required to increase the concentration of solute, and thus the polymer solution has an increased viscosity and is difficult for coating. Further, if polymers with low molecular weight are manufactured to obtain a proper viscosity of the polymer solution for coating, it is not able to form a film with excellent temperature resistance and mechanic strength. Moreover, the polymer solution is hard to preserve in a condition of maintaining the original degree of polymerization for a long time.

SUMMARY OF THE INVENTION

An object of the invention is to provide a polyimide resin containing polymaleic anhydride as a main chain, and the polymaleic anhydride grafting with reactively terminated functional groups for crosslinking at side chain positions, wherein the short chain has polyimide structure. The side chains are short that can decrease the degree of polymerization, and thus can avoid polymer solution too much viscous to form film by coating.

Another object of the invention is to provide a method for manufacturing a polyimide resin containing polymaleic anhydride. Because the invention uses a chemical ring closure step, the disadvantage of wrinkled surface of the thick film formed of the polyimide resin by the thermal ring closure step can be avoided.

Further another object of the invention is to provide a prepreg which has excellent temperature resistance and mechanical strength, and can be an insulation layer material for use in copper foil substrates and circuit boards. Still another object of the invention is to provide a copper foil substrate which has excellent temperature resistance and mechanical strength, and bonds with electronic elements to form an electronic device that can be operated in a strict environment of high temperature and high humidity without deterioration.

To accomplish the above object, there is provided a polyimide resin containing polymaleic anhydride having the formula:

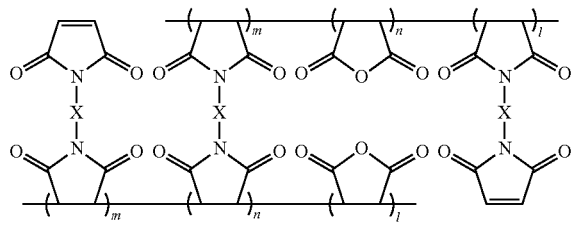

wherein X represents functional groups having carbon chain with carbon numbers more than 10, benzene ring and a combination of carbon chain with carbon numbers more than 10 and benzene ring; and m, n and l are integers, and larger than or equal to 1.

The invention provides a method for manufacturing a polyimide resin containing polymaleic anhydride. The method comprises steps of (i) dissolving and reacting a dianhydride with a diamine in the same mole amounts in a solvent to form polyamic acid; (ii) reacting polymaleic anhydride with the polyamic acid produced by the step (i) to form the polymaleic anhydride grafting with —NH—CO— group and oligomer having carboxylic acid group at side chains; (iii) crosslinking the polymaleic anhydride grafting with —NH—CO— group and oligomer having carboxylic acid group at side chains with another polymaleic anhydride grafting with —NH—CO— group and oligomer having carboxylic acid group at side chains; and carrying out a chemical ring-closure of the polyamic acid by adding a catalyst. Also, the invention provides a prepreg formed of a fiberglass cloth impregnated in the above polymaleic anhydride-polyimide resin. Further, the invention provides a copper foil substrate including a copper foil laminated with the above prepreg.

DETAILED DESCRIPTION OF THE INVENTION

Figure 1:
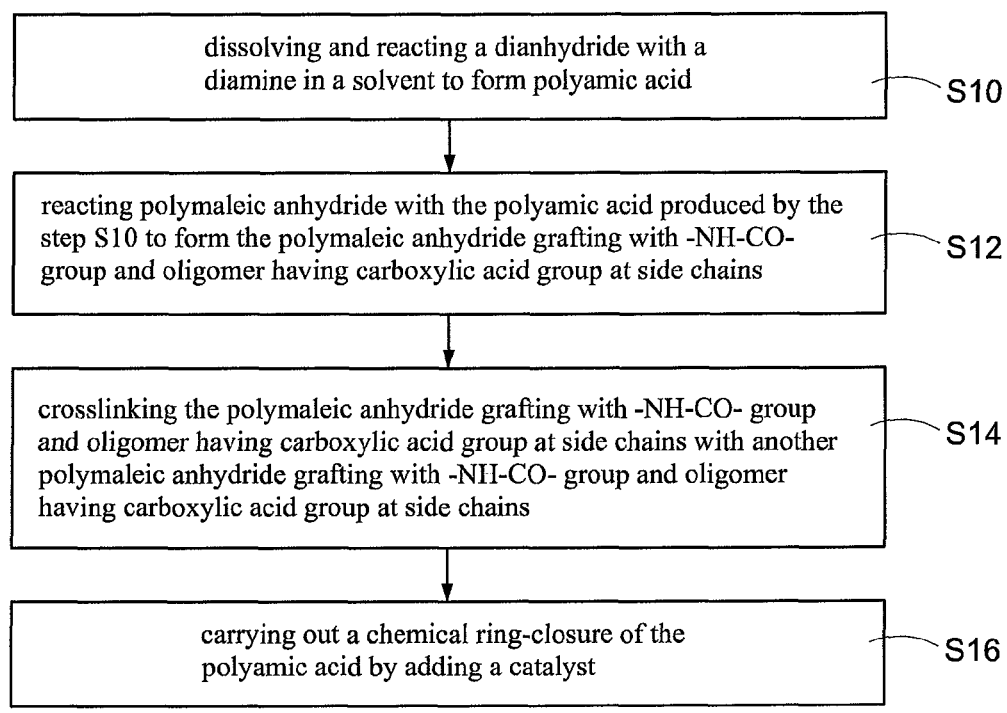
FIG. 1 is a flow chart of a method for manufacturing polyimide resins containing polymaleic anhydride of an embodiment of the present invention.

Please refer to FIG. 1. FIG. 1 is a flow chart of a method for manufacturing polyimide resins of an embodiment of the present invention. The method comprises steps of: dissolving and reacting a dianhydride with a diamine in a solvent to form polyamic acid, as shown in step S10; reacting polymaleic anhydride with the polyamic acid produced by the step S10 to form the polymaleic anhydride grafting with —NH—O— group and oligomer having carboxylic acid group at side chains, as shown in step S12; crosslinking the polymaleic anhydride grafting with —NH—CO— group and oligomer having carboxylic acid group at side chains with another polymaleic anhydride grafting with —NH—CO— group and oligomer having carboxylic acid group at side chains, as shown in step S14; and carrying out a chemical ring-closure of the polyamic acid by adding a catalyst, as shown in step S16. In another embodiment, the step S14 of crosslinking the polymaleic anhydride grafting with —NH—CO— group and oligomer having carboxylic acid group at side chains may be omitted.

Figure 2:
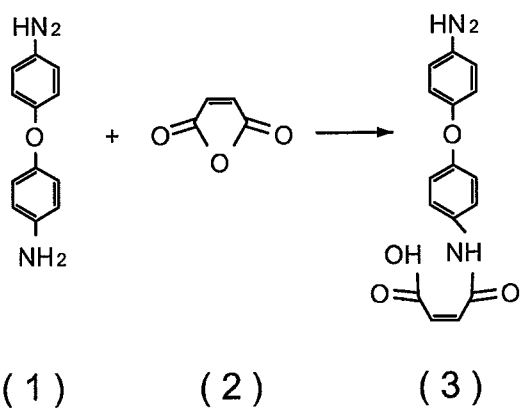
FIG. 2 is a diagram showing reactions for manufacturing polyimide resins containing polymaleic anhydride of an embodiment of the present invention.
Figure 2:
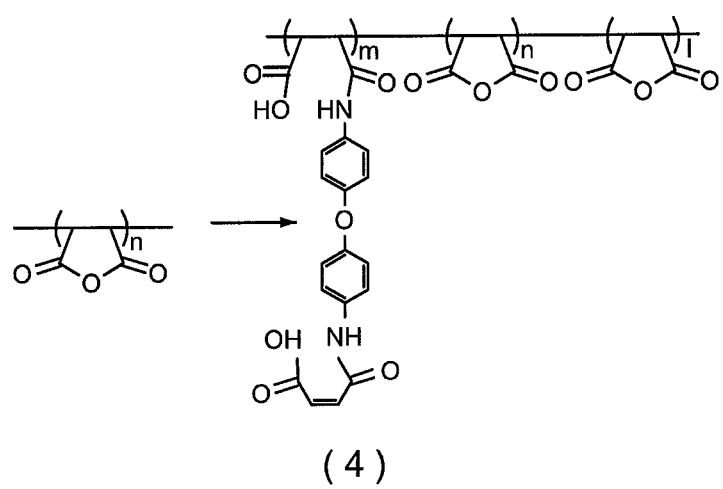
Figure 2:
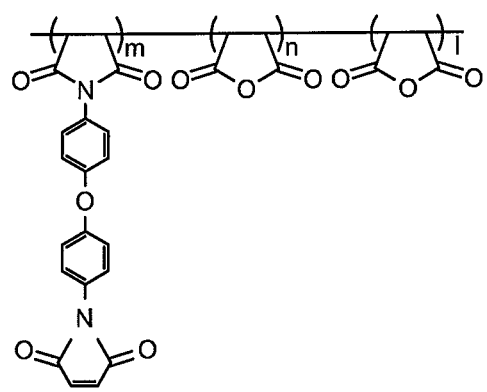

Next, please refer to FIG. 2. FIG. 2 is a diagram showing reactions for manufacturing polyimide resins of an embodiment of the present invention, in which the polyamic acid is produced by the reaction of 4,4'-oxydianiline with maleic anhydride monomers. In an embodiment, at first 4,4'-oxydianiline (shown as structural formula (1)) reacts with maleic anhydride monomers (shown as structural formula (2)) to form polyamic acid (shown as structural formula (3)). Next, polymaleic anhydride is added to react with the polyamic acid produced by the previous step to form the polymaleic anhydride grafting with —NH—CO— group and oligomer having carboxylic acid group at side chains (shown as structural formula (4)). Next, a chemical ring-closure of the polyamic acid grafting with —NH—CO— group and oligomer having carboxylic acid group at side chains is carried out by adding a catalyst to form a polyimide resin with polymaleic anhydride as a main chain (shown as structural formula (5)).

The method of the embodiment provides a polyimide resin with polymaleic anhydride as a main chain and grafting with reactively terminated functional groups for crosslinking at side chains, wherein the short chain has polyimide structure. According to one of embodiment of the invention, the polyimide resin may form a crosslinking network by a heating process because of the terminating end effect of double bonded anhydrides. According to the method of the embodiment, a polyamic acid intermediate at the side chain is formed from a diamine and a dianhydride. When the polyamic acid ring closes to form a polyimide, the thermal crosslinking functional groups at the side chain positions may also close. Therefore, the thermal ring-closure step by directly heating to about 300° C. is not suitable. In the embodiment, a chemical ring-closure step is employed by using catalyst and dehydrating agent reacting with the polyamic acid at 100° C. for 4 hours.

Figure 3:
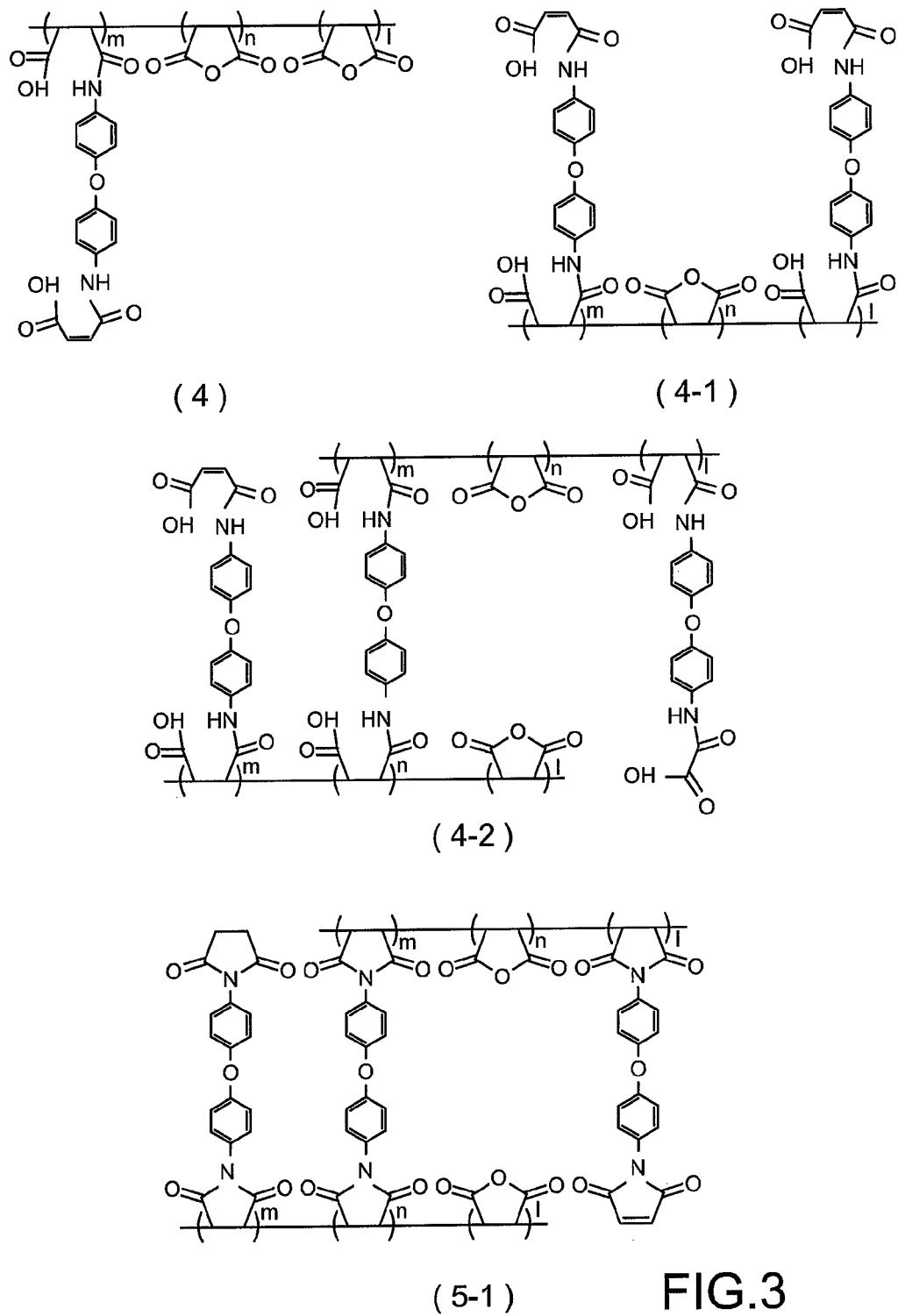
FIG. 3 is a diagram showing reactions for manufacturing polyimide resins containing polymaleic anhydride of another embodiment of the present invention.

In order to increase the temperature resistance, part of diamines functional groups at the side chains may be remained by selecting a proper terminating end ratio so as to crosslink with polymaleic anhydride. Therefore, the polyimide resin of the embodiment may form a crosslinking network by a thermal curing process. Please refer to FIG. 3. FIG. 3 is a diagram showing reactions for manufacturing polyimide resins of another embodiment of the present invention, in which the polyamic acid is produced by the reaction of 4,4'-oxydianiline with maleic anhydride monomers and part of diamines functional groups at the side chains may crosslink with another polymaleic anhydride. In an embodiment, at first 4,4'-oxydianiline (shown as structural formula (1) in FIG. 2) reacts with maleic anhydride monomers (shown as structural formula (2) in FIG. 2) to form polyamic acid (shown as structural formula (3) in FIG. 2), and then polymaleic anhydride is added to react with the polyamic acid produced by the previous step to form the polymaleic anhydride grafting with —NH—CO— group and oligomer having carboxylic acid group at side chains (shown as structural formula (4) in FIG. 2). Next, polymer having structural formula (4) crosslinks with another polymaleic anhydride grafting with —NH—CO— group and oligomer having carboxylic acid group at side chains (shown as structural formula (4-1)) to form a polymaleic anhydride grafting with —NH—CO— group and oligomer having carboxylic acid group at side chains with a crosslinking network (shown as structural formula (4-2)). Next, a chemical ring-closure of the polyamic acid grafting with —NH—CO— group and oligomer having carboxylic acid group at side chains with a crosslinking network is carried out by adding a catalyst to form a polyimide resin with polymaleic anhydride as a main chain (shown as structural formula (5-1)).

Because the polyimide resin of the embodiment has the double bonded anhydrides with carboxylic acid groups formed from hydroxyl, the polyimide resin may be extensively in the fields of printed circuit boards, surface heating element, electromagnetic shield material and flat cable, etc.

According to the method of the embodiment, a polyamic acid at the side chain is formed from a diamine and a dianhydride. Next, polymaleic anhydride is added to react with the polyamic acid produced by the previous step to form the polymaleic anhydride grafting with —NH—CO— group and oligomer having carboxylic acid group at side chains. Next, part of diamines functional groups may be remained by selecting a proper terminating end ratio so as to crosslink with another polymaleic anhydride by a thermal curing process. Next, a chemical ring-closure of the polyamic acid grafting with —NH—CO— group and oligomer having carboxylic acid group at side chains with a crosslinking network is carried out by adding a catalyst to form a polyimide resin with polymaleic anhydride as a main chain. The polyimide resin of the embodiment has excellent strength, temperature resistance and chemical resistance. The ring-closure reaction, also referred as imidization reaction, is carried out by the dehydration and condensation of —NH—CO— group and oligomer having carboxylic acid group to form a cyclic group.

Dianhydrides suitable for use in the methods of the invention include, but are not limited to: maleic anhydride, substituted maleic anhydride, tetrahydrophthalic anhydride, substituted tetrahydrophthalic anhydride, endomethylene tetrahydrophthalic anhydride, substituted endomethylene tetrahydrophthalic anhydride; aromatic dianhydrides, for example, pyromellitic dianhydride (PMDA), 4,4'-biphthalic dianhydride (BPDA), 4,4'-(hexafluoroisopropylidene)diphthalic anhydride (6FDA), 1-(trifluoromethyl)-2,3,5,6-phenyltetracarboxylic dianhydride (P3FDA), 1,4-bis(trifluoromethyl)-2,3,5,6-phenyltetracarboxylic dianhydride (P6GDA), 1-(3',4'-dicarboxyphenyl)-1,3,3-trimethylindane-5,6-dicarboxylic dianhydride, 1-(3',4'-dicarboxyphenyl)-1,3,3-trimethylindane-6,7-dicarboxylic dianhydride, 1-(3',4'-dicarboxyphenyl)-3-methylindane-5,6-dicarboxylic dianhydride, 1-(3',4'-dicarboxyphenyl)-3-methylindane-6,7-dicarboxylic dianhydride, 2,3,9,10-perylene-tetracarboxylic dianhydride, 1,4,5,8-naphthalene-tetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-2,4,5,8-tetracarboxylic dianhydride, phenanthryl-1,8,9,10-tetracarboxylic dianhydride, 3,3',4,4'-diphenylketone-tetracarboxylic dianhydride, 1,2',3,3'-diphenylketone-tetracarboxylic dianhydride, 3,3',4,4'-biphenyl-tetracarboxylic dianhydride, 3,3',4,4'-diphenylketone-tetracarboxylic dianhydride, 2,2',3,3'-biphenyl-tetracarboxylic dianhydride, 4,4'-(isopropylidene)diphthalic anhydride, 3,3'-(isopropylidene)diphthalic anhydride, 4,4'-oxy-diphthalic anhydride, 4,4'-sulfanyl-diphthalic anhydride, 3,3'-oxy-diphthalic anhydride, 4,4'-(methylene)diphthalic anhydride, 4,4'-(sulfur)diphthalic anhydride, 4,4'-(ethylene)diphthalic anhydride, 2,3,6,7-naphthalene-tetracarboxylic dianhydride, 1,2,4,5-naphthalene-tetracarboxylic dianhydride, 1,2,5,6-naphthalene-tetracarboxylic dianhydride, phenyl-1,2,3,4-tetracarboxylic dianhydride, pyrazine-2,3,5,6-tetracarboxylic dianhydride, in which anhydrides preferable for use include pyromellitic dianhydride, 4,4'-biphthalic dianhydride, 4,4'-(hexafluoroisopropylidene)diphthalic anhydride (6FDA), 1-(trifluoromethyl)-2,3,5,6-phenyltetracarboxylic dianhydride (P3FDA) and 1,4-bis(trifluoromethyl)-2,3,5,6-phenyltetracarboxylic dianhydride (P6GDA).

Diamines suitable for use in the methods of the invention include, but are not limited to: 4,4'-oxydianiline (ODA), 5-amino-1-(4'-aminophenyl)-1,3,3-trimethylindane, 6-amino-1-(4'-aminophenyl)-1,3,3-trimethylindane, 4,4'-methylene-bis(o-chloroaniline), 3,3'-dichlorodianiline, 3,3'-sulfanyldianiline, 4,4'-diaminobenzophenone, 1,5-diaminonaphthalene, bis(4-aminophenyl) diethyl silane, bis(4-aminophenyl) diphenyl silane, bis(4-aminophenyl) ethylphosphine oxide, N-(bis(4-aminophenyl))-N-methylamine, N-(bis(4-aminophenyl))-N-phenylamine, 4,4'-methylene-bis(2-methylaniline), 4,4'-methylene-bis(2-methoxylaniline), 5,5'-methylene-bis (2-amino-phenol), 4,4'-methylene-bis(2-methylaniline), 4,4'-oxy-bis(2-methoxylaniline), 4,4'-oxy-bis(2-chloroaniline), 2,2'-bis(4-amino-phenol), 5,5'-oxy-bis(2-amino-phenol), 4,4'-sulfur-bis(2-methylaniline), 4,4'-sulfur-bis(2-methoxylaniline), 4,4'-sulfur-bis(2-chloroaniline), 4,4'-sulfanyl-bis(2-methylalinine), 4,4'-sulfanyl-bis(2-ethoxylalinine), 4,4'-sulfanyl-bis(2-chloroalinine), 5,5'-sulfanyl-bis(2-amino-phenol), 3,3'-dimethyl-4,4'-diaminobenzophenone, 3,3'-dimethoxyl-4,4'-diaminobenzophenone, 3,3'-dichloro-4,4'-diaminobenzophenone, 4,4'-diaminobiphenyl, m-phenylenediamine, p-phenylenediamine, 4,4'-methylene-dialinine, 4,4'-sulfur-dialinine, 4,4'-sulfanyl-dialinine, 4,4'-isopropylene-dialinine, 3,3'-dimethyldialinine, 3,3'-dimethoxyldialinine, 3,3'-dicarboxydialinine, 2,4-methylphenyldiamine, 2,5-methylphenyldiamine, 2,6-methylphenyldiamine, m-dimethylphenyldiamine, 2,4-diamino-5-chlorotoluene, 2,4-diamine-6-chlorotoluene, etc., in which 4,4'-oxydianiline (ODA) is preferable.

According to one embodiment of the method of the invention, a polyamic acid is formed in a solvent. The solvents suitable for use in the methods of the invention include, but are not limited to: polar non-protic compounds, ether-based compounds, water-soluble alcohol-based compounds, non-water-soluble alcohol-based compounds and ketone-based compounds as long as the diamines and dianhydrides can be dissolved in the solvents.

Specifically, the polar non-protic compounds can include, for example, N-methyl pyrrolidin ketone, N,N-dimethyl-formylamide, N,N-dimethyl-acetamide, dimethylsulphoxide and hexamethylphosphoric triamide, etc.

The ether-based compounds can include, for example, 2-methoxyethanol, 2-ethoxyethanol, 2-(methoxy) ethoxyethanol, 2-isopropoxyethanol, 2-butoxyethanol, tetrahydrofurfuryl alcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxyl-2-propanol, 1-ethoxyl-2-propanol, dipropylene glycol, dipropylene glycol monomethyl ether, dipropylene glycol monoethyl ether, tripropylene glycol monoethyl ether, polyethylene glycol, polypropylene glycol, tetrahydrofuran, 1,2-dimethoxyethane, diethylene glycol dimethyl ether and diethylene glycol diethyl ether, etc.

The water-soluble alcohol-based compounds can include, for example, methanol, ethanol, 1-propanol, 2-propanol, tert-butanol, ethylene glycol, 1,2-propylene glycol, 1,3-propylene glycol, 1,3-butylene glycol, 1,4-butylene glycol, 2,3-butylene glycol, 1,5-pentylene glycol, 2-butene-1,4-glycol, 2-methyl-2,4-pentylene glycol, 1,2,6-hexanetriol, diacetone alcohol, etc. The non-water-soluble alcohol-based compounds can include, for example, benzyl alcohol.

The ketone-based compounds can include, for example, 1,5,5-trimethyl-3-cyclohexanone. Also, another solvent, for example, γ-butyrolactone can be used in the method. The above solvents can be used independently or in mixture of two kinds.

The above solvents used independently are preferable, for example, N-methyl pyrrolidin ketone, N,N-dimethyl-formylamide, N,N-dimethyl-acetamide and diethylene glycol monomethyl ether. The above solvents used in mixture of two kinds are preferable, for example, N-methyl pyrrolidin ketone and diethylene glycol monomethyl ether, N-methyl pyrrolidin ketone and methanol, N-methyl pyrrolidin ketone and 2-methoxyethanol.

The amount of the solvent used in the reaction will depend on the characteristics of the polyamic acid that is formed. Typically, the polar non-protic solvent is used in the range of 70-90 mass % based on the mass of the diamines and dianhydrides.

"Dianhydrides," as used herein, refer to include their precursors and derivatives that can react with diamines to form polyamic acid, and then the polyamic acid may form polyimides by a chemical conversion process. "Diamines," as used herein, refer to include their precursors and derivatives that can react with dianhydrides to form polyamic acid, and then the polyamic acid may form polyimides by a chemical conversion process.

"Polyamic acid," as used herein, refers to include any precursors of polyimides. The polyamic acid is derived from a combination of dianhydride monomers and diamine monomers or their functional equivalents, and the polyamic acid may form polyimides by a chemical conversion process.

"Prepolymers," as used herein, refers to a polyamic acid solution with relatively low molecular weight. The polyamic acid solution may be prepared by stoichiometric excess of diamines to obtain a solution having viscosity of about 50-100 poise.

"Chemical conversion" or "chemical converted," as used herein, refers to convert the polyamic acid into polyimides and partly convert the polyamic acid into polyimides in use of catalysts and/or adehydrating agents.

"Chemicals of conversion" or "chemicals of imidization," as used herein, refers to catalysts and/or dehydrating agents that are suitable for use in the conversion of the polyamic acid to polyimides.

It is to be understood amounts, concentrations, numerical values or parameters designated to a range, a preferable range or upper and lower preferable values are a specific disclosure of all ranges that are consisted of any pairs of upper limitations or preferable values and lower limitations or preferable values of any ranges without individual disclosures of those ranges. Unless specifically defined otherwise, a range of numerical values, as used herein, refers to include all integers and fractions between and including end points. The scope of the invention is not intended to be limited to specific values defining a range.

In certain embodiments, polyimides that are formed of a chemical conversion are manufactured by mixing the polyamic acid and catalysts and/or dehydrating agents that are suitable for use in the conversion of the polyamic acid to polyimides. In the chemical conversion process, the polyamic acid solution is impregnated or mixed in the chemicals of conversion (imidization). In one embodiment, the chemicals of conversion are tertiary amine catalysts and anhydride dehydrating agents. In the embodiment, the anhydride dehydrating agent is acetic anhydride. Typically, the acetic anhydride is used in excess of moles to amide acid functional groups of the polyamic acid and the acetic anhydride is used in the range of 1.2-2.4 moles based on per equivalent of polyamic acid. In one embodiment, the tertiary amine catalyst is used in the same amount of moles of the acetic anhydride.

Alternatively, the compounds suitable for use as the dehydrating agent include: (i) other aliphatic anhydrides such as propionic anhydride, butyric anhydride, valeric anhydride and their mixtures; (ii) anhydrides of aromatic monocarboxylic acid; (iii) the mixture of aliphatic anhydrides and aromatic anhydrides; (iv) carbodimides; and (v) aliphatic ketenes.

In one embodiment, the tertiary amine catalyst is pyridine and beta-picoline, and the amount of tertiary amine catalyst is typically the same to moles of the anhydride dehydrating agent. The amount of the catalyst used in the method depends on the desired conversion rate and the species of the catalyst. Other tertiary amine catalysts that have a similar activity to pyridine and beta-picoline can also be used in the method. These tertiary amines include alpha picoline, 3,4-lutidine, 3,5-lutidine, 4-picoline, 4-isopropylpyridine, N,N-dimethylbenzyl amine, isoquinoline, 4-benzylpyridine, N,N-dimethyldodecylamine, triethyl amine and the like. Other catalysts suitable for use in imidization may be, for example, imidazole.

The chemicals of conversion are typically in reaction to convert the polyamic acid to polyimide in room temperature or above room temperature. In one embodiment, the conversion is carried out in temperature of 15° C. to 120° C. The reaction is carried out very fast in higher temperature, and slower in lower temperature.

In one embodiment, the polyamic acid is formed by the following steps: dissolving almost the same moles of dianhydride monomers and diamine monomers in a solvent; and forming a prepolymer by polymerization of the dianhydride and the diamine in a condition of a predetermined temperature and stirring. Typically, at first the diamine monomers are used in excess to control molecular weight and viscosity, and then the diamine monomers are used insufficiently to increase molecular weight and viscosity.

EXAMPLE

To a 1 L 3-neck flask equipped with a mechanical stirring device, reflux condenser introducing nitrogen gas was added 7.35 g maleic anhydride (MAH), which was dissolved in 200 g solvent of dimethyl-acetamide for 10 minutes, while maintaining a temperature of oil bath pot about 40-50° C. This was followed by the addition of 8.0 g 4,4'-oxydianiline (ODA), while maintaining the solution at a temperature of 40-50° C. for one hour. Next, the solution was heated to 80° C. To the amic acid solution was added 100 g polymaleic anhydride, and reacted at 80° C. for one hour. This was followed by the addition of 10.012 g catalyst of pyridine and 11 g dehydrating agent of acetic anhydride, while heating to a temperature of oil bath pot of 100° C. for two hours to obtain the product of polymaleic anhydride-polyimide resin.

Figure 4:
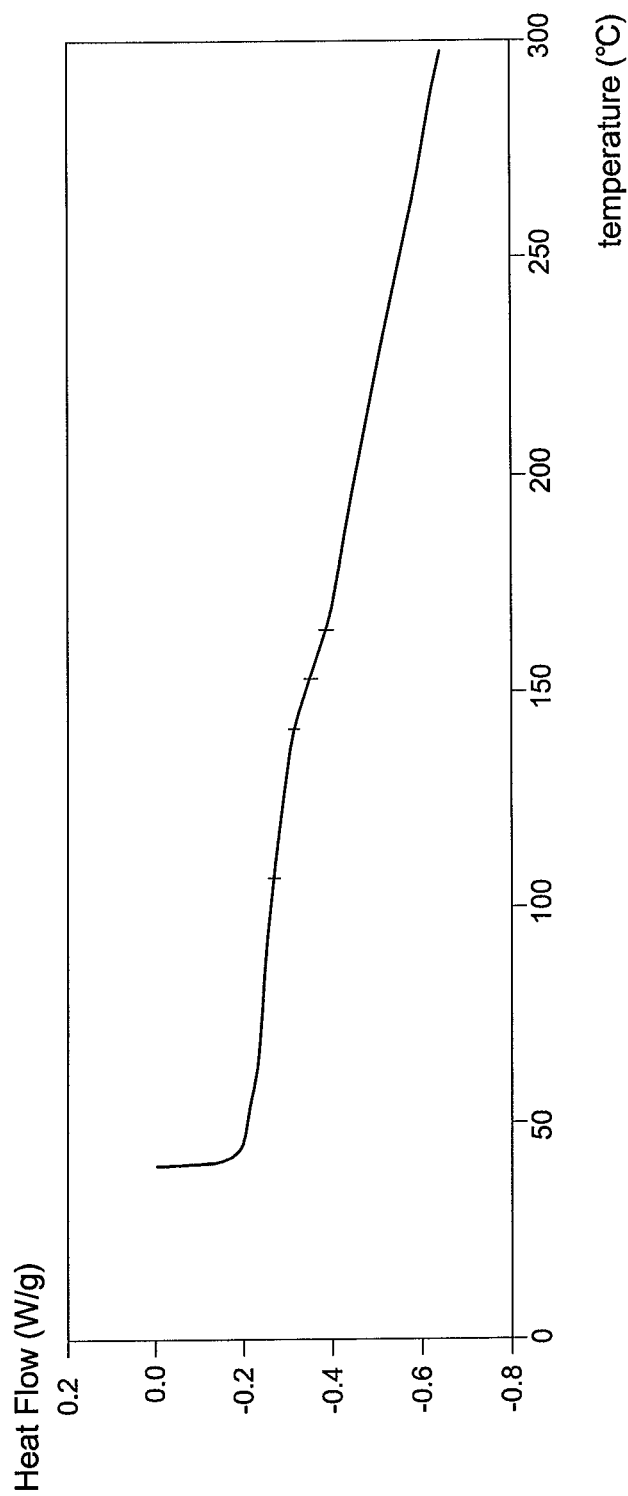
FIG. 4 is a graph showing phase transition of the polymaleic anhydride-polyimide resin of an embodiment of the invention measured by differential scanning calorimetry (DSC).
Figure 5:
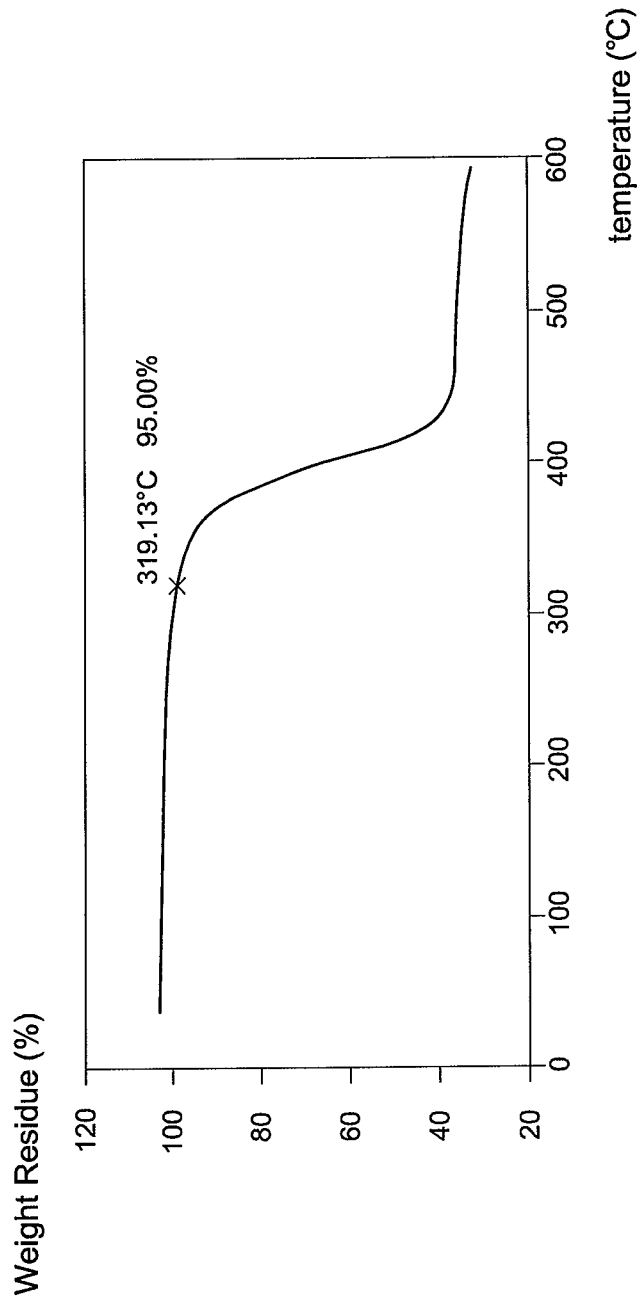
FIG. 5 is a graph showing the weight residue of the polymaleic anhydride-polyimide resin of an embodiment of the invention when heated to various temperatures.
Figure 6:
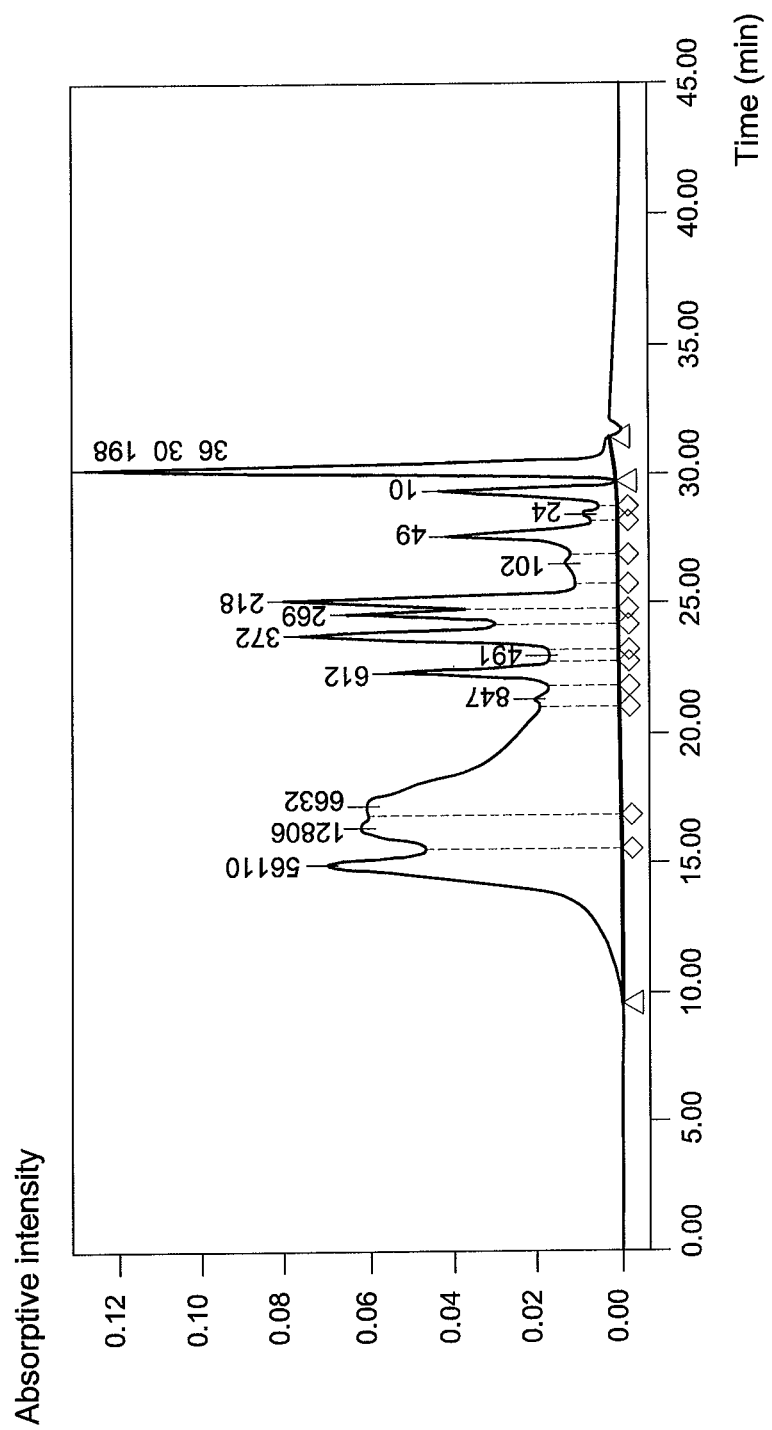
FIG. 6 is a graph showing absorptive intensity with various time of the polymaleic anhydride-polyimide resin of an embodiment of the invention measured by gel permeation chromatography (GPC).

The characteristic tests of the product were carried out, and the results were shown in FIGS. 4-8. FIG. 4 is a graph showing phase transition of the product measured by differential scanning calorimetry (DSC). As can be seen in FIG. 4, glass transition temperature of the product is about 150° C. FIG. 5 is a graph showing the weight residue of the product when heated to various temperatures. As can be seen in FIG. 5, 5 wt % thermal gravimetric temperature of the product is about 319° C. FIG. 6 is a graph showing absorptive intensity with various time of the product measured by gel permeation chromatography (GPC). When characterizing polymers, it is important to consider the polydispersity index (PDI) as well the molecular weight. Polymers can be characterized by a variety of definitions for molecular weight including the number average molecular weight (Mn) and the weight average molecular weight (Mw). GPC allows for the determination of PDI and based on other data, the Mn and Mw can be determined. According to the graph of FIG. 6, the result of data analysis is listed in Table 1. As can be seen in Table 1, Mw can be up to about $2.6 \times 10^6$.

| Name | Retention Time (min) | Mn | Mw | MP | Polydispersity | Area (μV * sec) | % Area | % Height |
|---|---|---|---|---|---|---|---|---|
| 4 | 14.967 | 70913 | 2620992 | 56110 | 36.961 | 6020541 | 17.09 | 9.83 |
| 8 | 16.415 | 14212 | 15824 | 12806 | 1.113 | 4320876 | 12.27 | 8.59 |
| 11 | 17.234 | 2604 | 3838 | 6632 | 1.474 | 9280771 | 26.35 | 8.44 |
| 21 | 21.385 | 833 | 837 | 847 | 1.005 | 843085 | 2.39 | 2.92 |

Figure 7:
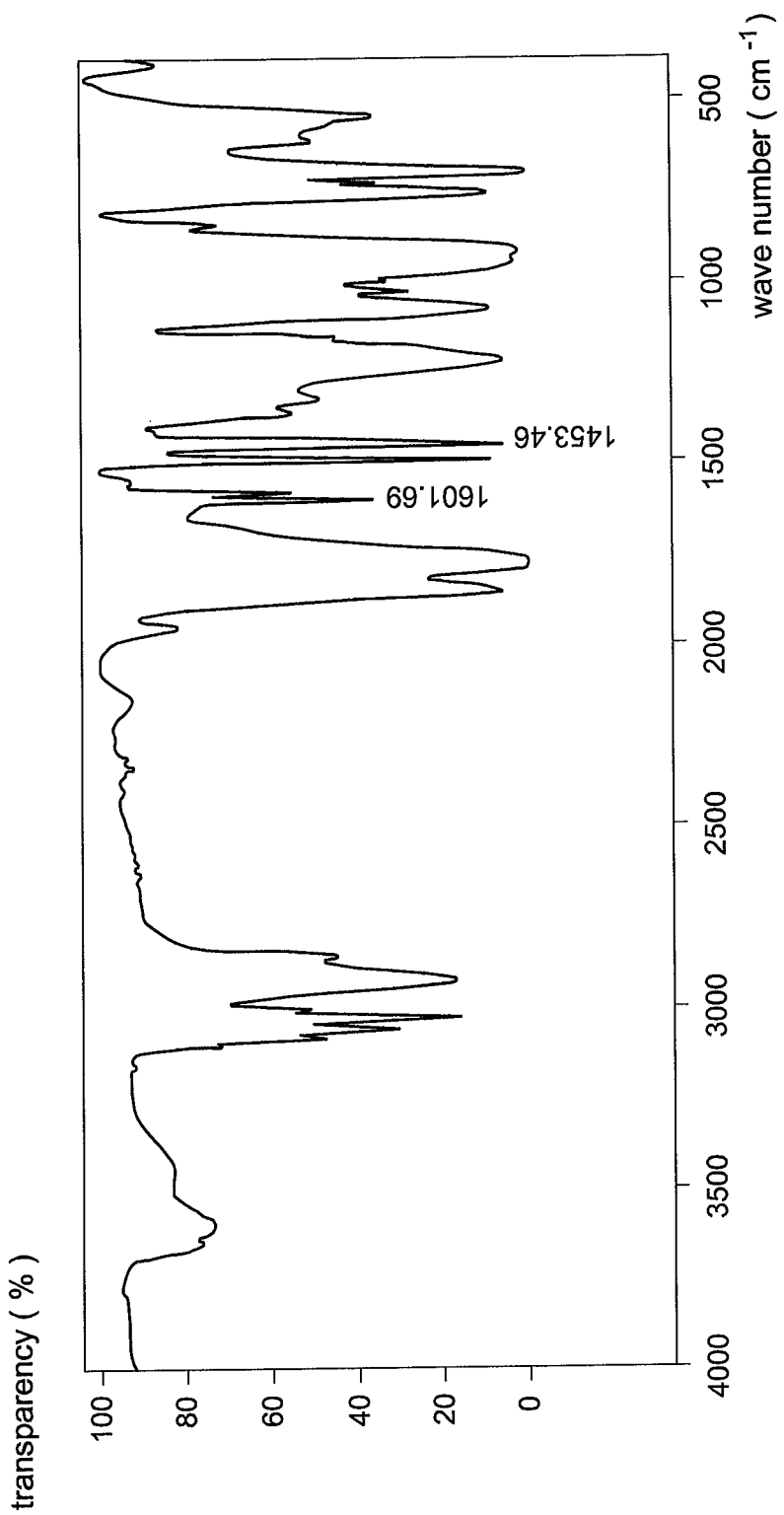
FIG. 7 is a graph showing IR absorption spectroscopy of the polymaleic anhydride-polyamic acid of an embodiment of the invention.
Figure 8:
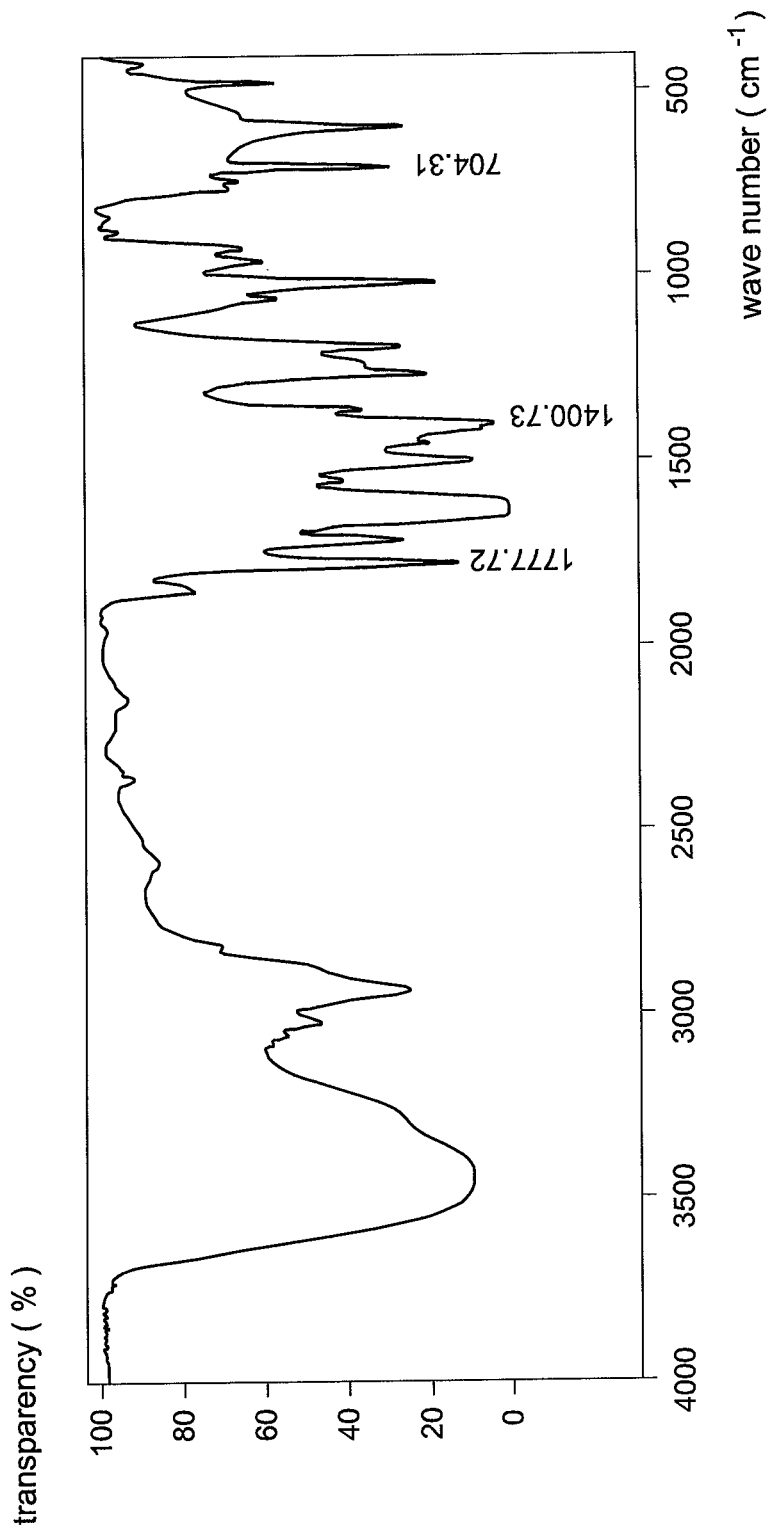
FIG. 8 is a graph showing IR absorption spectroscopy of the polymaleic anhydride-polyimide resin of an embodiment of the invention.

FIG. 7 is a graph showing IR absorption spectroscopy of the polymaleic anhydride-polyamic acid of an embodiment of the invention. FIG. 8 is a graph showing IR absorption spectroscopy of the polymaleic anhydride-polyimide resin of an embodiment of the invention. As can be seen in FIG. 7, wave numbers 1453 cm-1 and 1601 cm-1 represent respectively N—H bending peak and C=O stretching peak of polyamic acid structure. The above two peaks may disappear and new peaks may form after ring closure of the polyamic acid and formation of polyimide. The new peaks include wave number 1400 cm-1 representing tertiary amine of polyimide structure, wave numbers 704 cm-1 and 1777 cm-1 representing C=O stretching peak of polyimide structure, as shown in FIG. 8.

Further, the invention provides a prepreg formed of a fiberglass cloth impregnated in the above polymaleic anhydride-polyimide resin. The prepreg has excellent temperature resistance and mechanical strength, and can be an insulation layer material for use in copper foil substrates and circuit boards.

Also, the invention provides a copper foil substrate including a copper foil laminated with the above prepreg. The copper foil substrate has excellent temperature resistance and mechanical strength, and bonds with electronic elements to form an electronic device that can be operated in a strict environment of high temperature and high humidity without deterioration.

While the invention is described in by way of examples and in terms of preferred embodiments, it is to be understood that the invention is not limited thereto. On the contrary, the aim is to cover all modifications, alternatives and equivalents falling within the spirit and scope of the invention as defined by the appended claims.

What is claimed is:

1. A polyimide resin containing polymaleic anhydride having the formula:

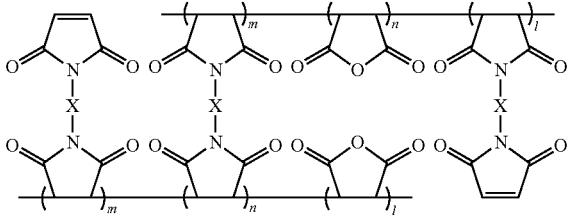

wherein X represents functional groups having a carbon chain with carbon numbers more than 10, a benzene ring and a combination of a carbon chain with carbon numbers more than 10 and a benzene ring; and m, n and l are integers, and larger than or equal to 1.

2. A prepreg formed of a fiberglass cloth impregnated in the polyimide resin containing polymaleic anhydride of claim 1.

3. A copper foil substrate including at least one copper foil laminated with the prepreg of claim 2.

* * * * *